June 4, 1929.　　　　　H. O. HEM　　　　　1,715,834
COIN CONTROLLED WEIGHING SCALE
Filed May 23, 1925　　　　4 Sheets-Sheet 4
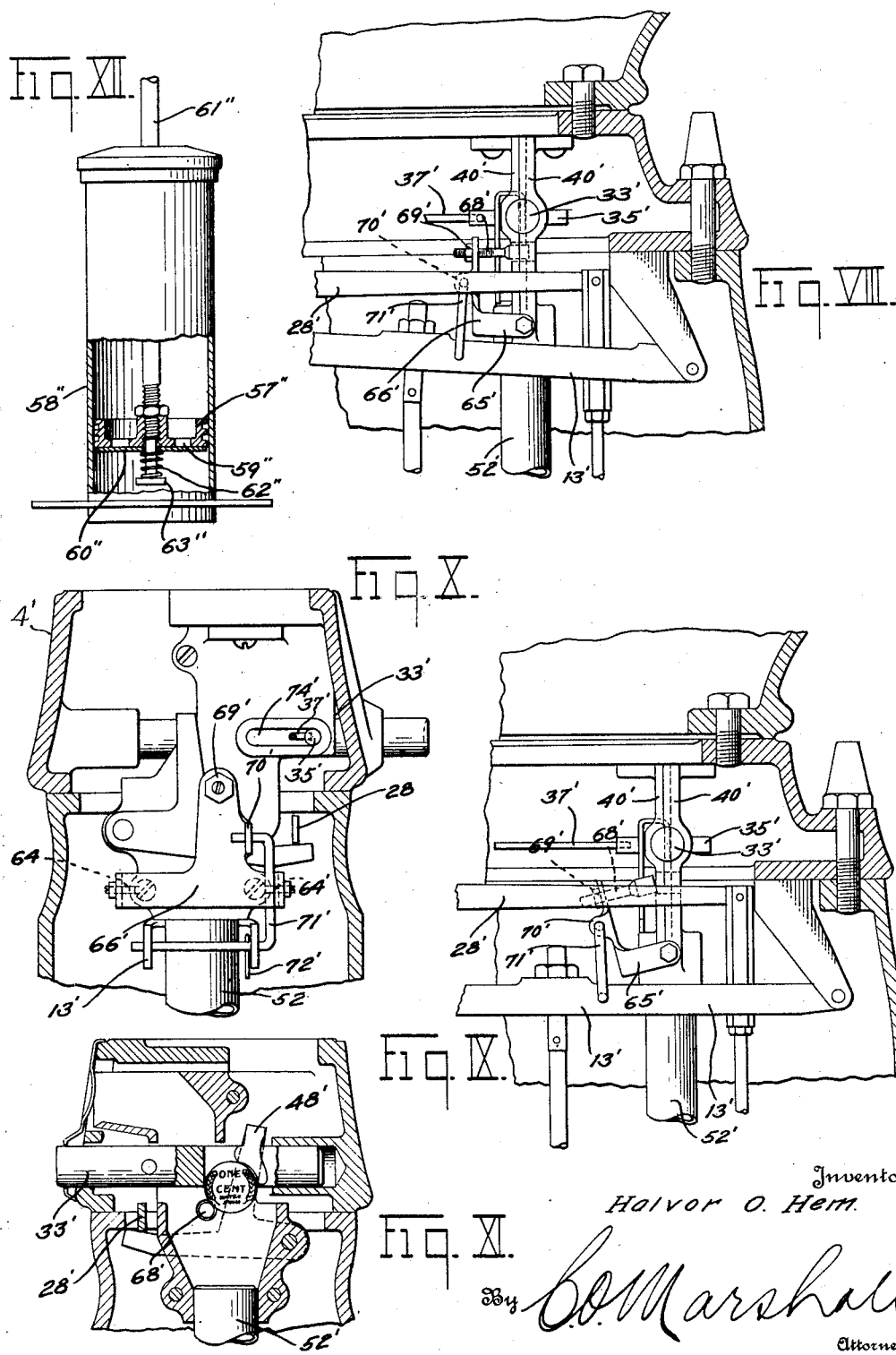
Inventor
Holvor O. Hem.
By C. O. Marshall
Attorney Patented June 4, 1929.

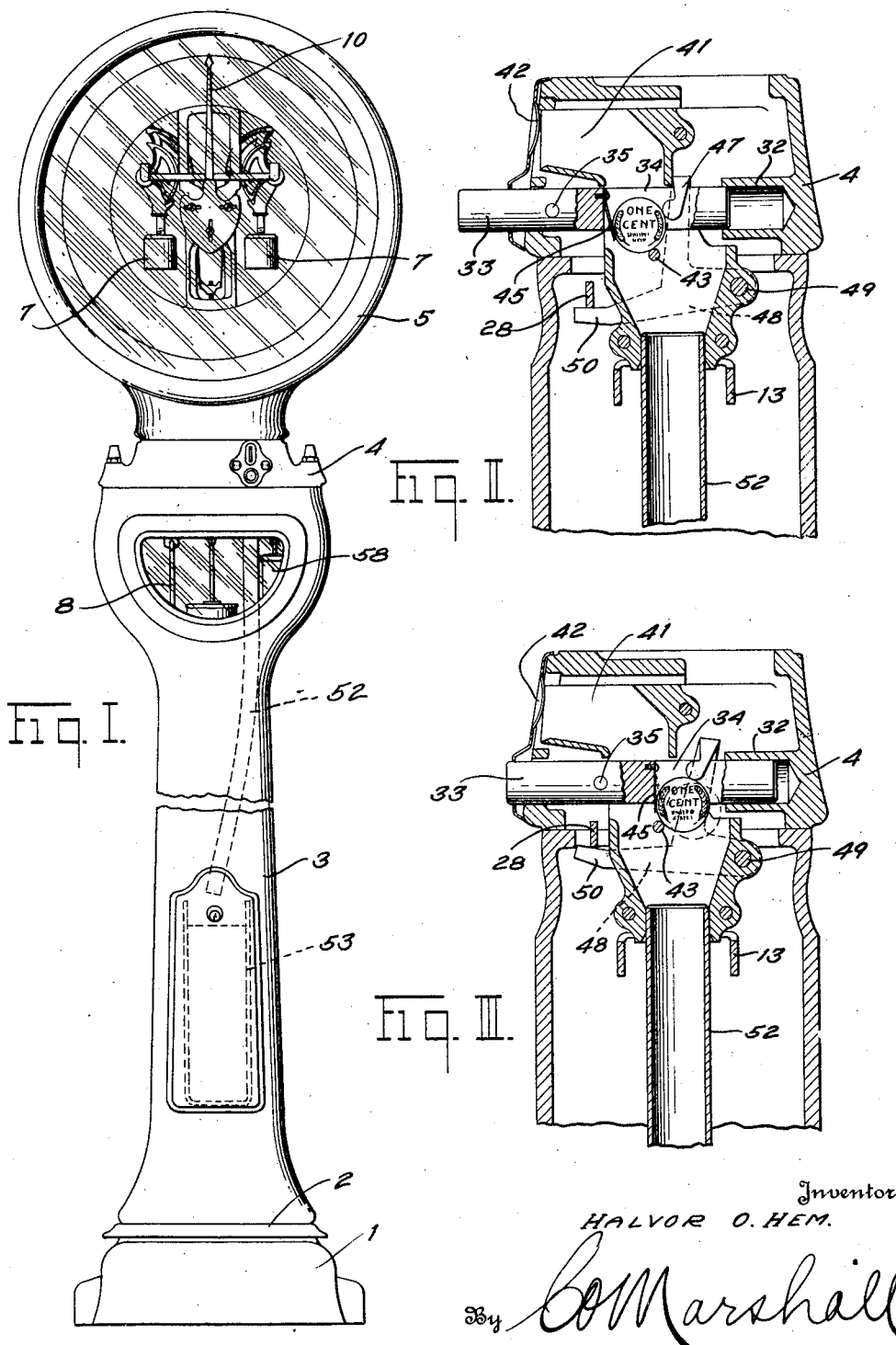

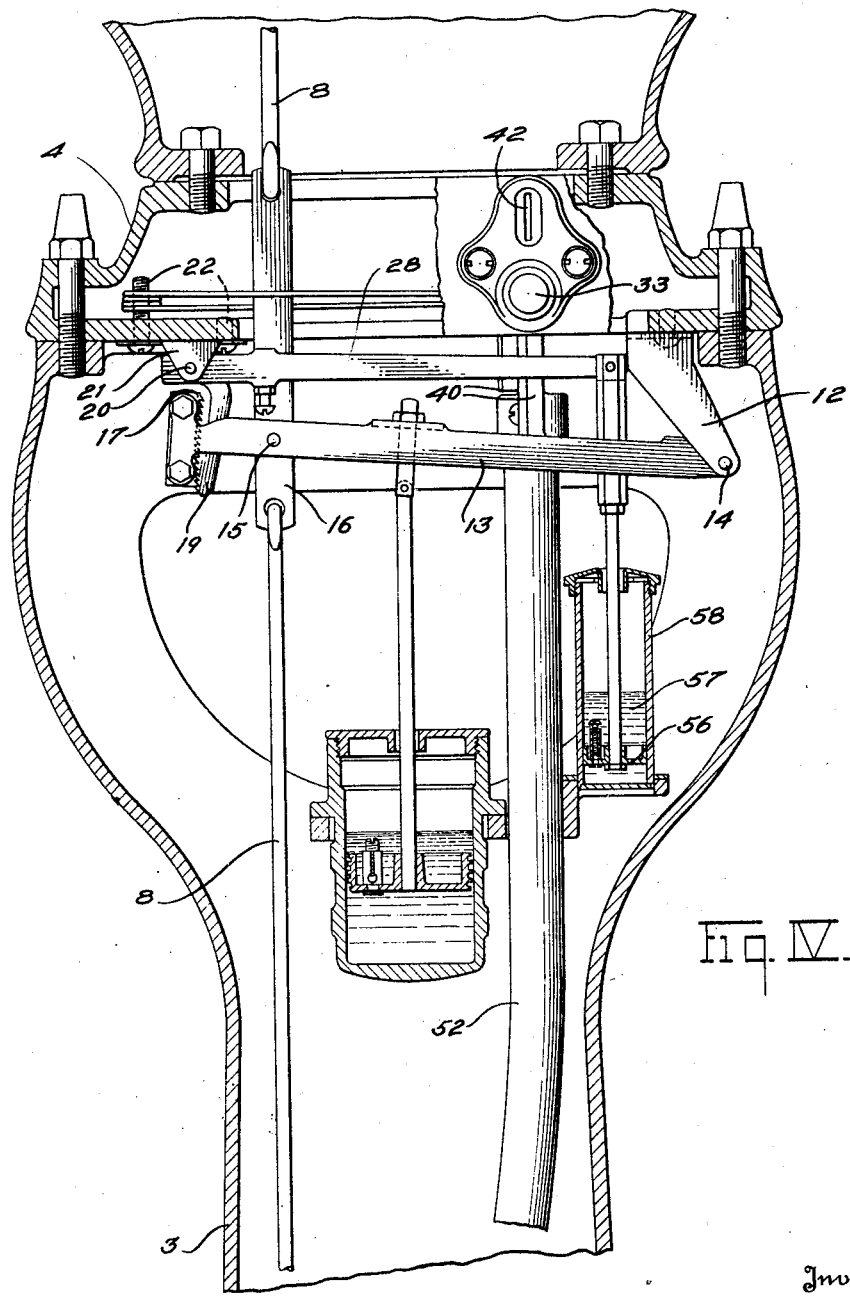

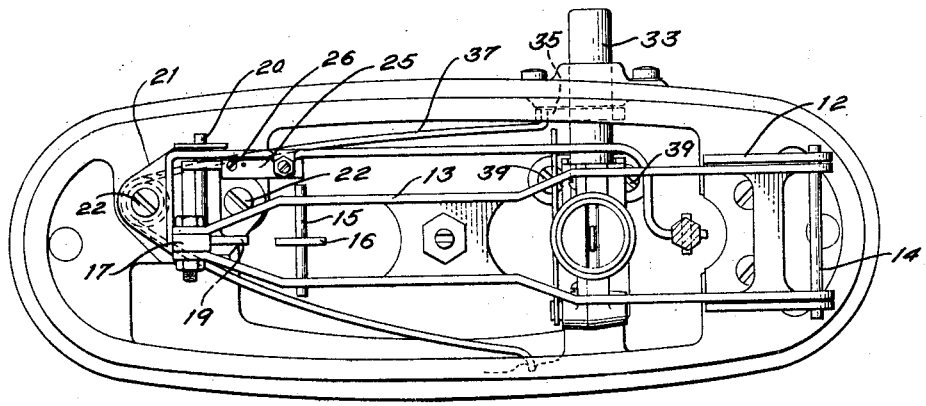
Fig. V.
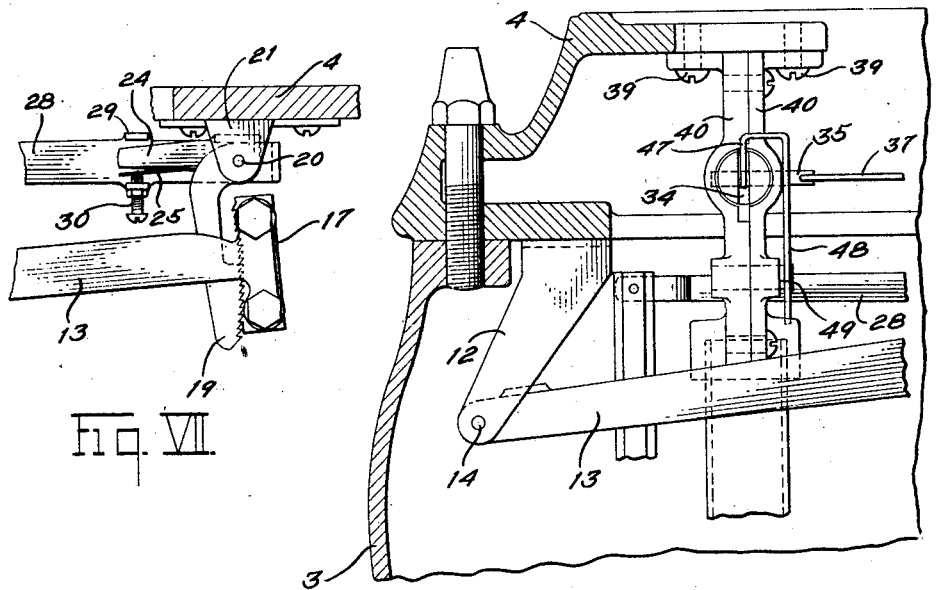
Fig. VII.  Fig. VI.

1,715,834

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

COIN-CONTROLLED WEIGHING SCALE.

Application filed May 23, 1925. Serial No. 32,260.

This invention relates to weighing scales, and more particularly to scales in which the load-counterbalancing and indicating mechanisms are normally locked against weighing movement but may be released by pressing a button or other manual operation.

One of the principal objects of the invention is the provision of a weighing scale in which the releasing mechanism may be rendered operable only upon the insertion of a coin which acts as a key, thus forming a part of the releasing means.

Another object is the provision of a coin controlled weighing machine in which the device for releasing the load-counterbalancing and indicating mechanism is simple, sturdy and positive in its operation.

A further object of the invention is to provide a weighing machine of this type so constructed that only one weighing may be obtained for each coin inserted.

A further object of the invention is to provide a coin controlled locking device which may be assembled as a unit and incorporated in a weighing scale of this type and removed therefrom as a unit.

Still a further object of this invention is the provision of a coin controlled weighing mechanism which may be easily incorporated in person weighing scales of known construction without necessitating material alterations in the weighing mechanism.

And still another object is the provision of a coin controlled locking device which may be used in conjunction with a person weighing scale without in any way affecting the accuracy of the scale.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a weighing scale of the person weigher type embodying my invention;

Figure II is an enlarged transverse sectional view through the coin chute showing the position of the coin and adjacent mechanism immediately after its insertion in the scale;

Figure III is a view similar to Figure II showing the position of the coin and adjacent mechanism when the weighing mechanism is unlocked;

Figure IV is an enlarged vertical sectional view through that portion of the scale supporting the coin controlled mechanism;

Figure V is a bottom plan view of the coin controlled mechanism;

Figure VI is an enlarged fragmentary sectional view of a portion of the scale showing part of the coin controlled device as it appears from the rear of the scale;

Figure VII is an enlarged fragmentary elevational view of certain elements forming part of my invention;

Figure VIII is an enlarged fragmentary view of a portion of the coin control mechanism showing a modified form of the coin discharging means;

Figure IX is a view similar to Figure VIII showing certain parts thereof in a different position;

Figure X is a transverse sectional view of the device illustrated in Figure VIII;

Figure XI is a transverse sectional view showing the coin controlled mechanism in a released position; and Figure XII is an enlarged detail view showing a modified form of dash pot.

Referring to the drawings in detail, the base 1 of the scale encloses and supports lever mechanism (not shown) which in turn supports the load-receiving platform 2. A hollow column 3 is erected upon one end of the base 2 and extends upwardly therefrom, and upon the upper portion thereof is mounted a shell-like frame 4 which carries the coin controlled locking mechanism. Superimposed upon the frame 4 is a substantially watch-case-shaped housing 5 which supports and encloses the automatic load-counterbalancing mechanism of the scale.

The load-counterbalancing mechanism illustrated is substantially of the type shown and described in U. S. Patent No. 1,203,611, to Hapgood, dated November 7, 1916, and includes a pair of oppositely swinging pendulums connected by means of a steelyard rod 8 to the platform lever mechanism and adapted to swing outwardly and upwardly to counterbalance loads on the scale platform. The pendulum mechanism is suitably connected by means of rack and pinion mechanism (not shown) to an indicator hand 10 which indicates the load upon a chart mounted within the housing 5 and visible through a glazed window in the face thereof.

Fixed to the frame 4 is a U-shaped bracket 12, to the depending arms of which is pivoted a lever 13, as at 14. The lever 13 is connected by means of a pin 15 to a link 16 interposed between sections of the steelyard rod 8, so that the lever is swung about its pivot 14 as the steelyard rod moves downwardly. When there is no load on the scale platform and the indicator hand 10 is in zero position, the lever 13 is in the position shown in Figure IV.

Fixed to one end of the lever 13 is a serrated or notched bar 17, the teeth of which are normally in mesh with the teeth of a toothed finger or pawl 19. The pawl 19 is pivoted on a pintle 20 carried by a bracket 21 which is secured to the frame 4 by means of screws 22. With the teeth of the lever 13 engaged by the teeth of the bar 17 a load upon the platform of the scale will only slightly affect the load-counterbalancing and indicating mechanism, because the lever 13 being locked against movement, the steelyard rod 8 cannot be pulled downwardly by the platform load.

The pawl 19 is provided with a horizontal projection 24 to which is secured a resilient member or tension plate 25 by means of a screw 26. Another lever 28 also pivoted upon the pintle 20 and extending substantially parallel with the lever 13 is provided with a pair of laterally projecting lugs 29 loosely embracing the projection 24, the lowermost of said lugs having a threaded opening therein to receive a screw 30. It will be apparent upon examination of Figure VII that an upward movement of the lever 28 will bring the screw 30 into engagement with the resilient member 25, causing a flexing thereof and moving the resilient member 25 into engagement with the projection 24, causing the latter to be slightly rotated in a clockwise direction about the pintle 20. This movement of the projection 24 moves the teeth of the pawl 19 out of mesh with the teeth on the bar 17, thereby releasing the lever 13 so that a load on the scale platform may act through the steelyard rod 8 upon the load-counterbalancing and indicating mechanism of the scale. The purpose of the interposition of the resilient member 25 between the screw 30 and the projection 24 will be hereinafter explained.

Projecting inwardly from the rear wall of the frame 4 in a boss 32 and slidably positioned in the frame 4 and boss 32 is a forwardly extending plunger 33 provided with a longitudinal slot 34. The plunger 33 is also provided with a pin 35, one end of which has an opening adapted to receive the end of a hairpin-shaped spring 37, the other end of which engages the wall of the frame 4. This spring acts to resiliently hold the plunger 33 in its outermost position.

Fixed to the frame 4 by means of screws 39 is a pair of members 40, one of said members having a recessed portion forming a coin chute 41. The slot 34 in the plunger 33 being in registration with the coin chute 41, a coin inserted through the entrance or slot 42 passes by gravity through the upper portion of the coin chute until its movement is limited by a pin 43, the coin assuming a position in the slot 34 of the plunger 33 as illustrated in Figure II. The base of the slot 34 is provided with a resilient member 45 fixed in any suitable manner to the plunger. After the insertion of a proper coin inward pressure on the plunger 33 brings the resilient member 45 into engagement with the coin, moving the same rearwardly, the periphery of the coin engaging a hook-like projection 47 forming an integral part of a lever 48, the latter being pivoted to the members 40, as at 49. Further inward movement of the coin to a position shown in Figure III moves the lever 48 upward, causing a projection 50 thereof, which is in constant engagement with the lever 28, to elevate the latter, thereby disengaging the teeth of the pawl 19 from those of the bar 17 in the manner hereinbefore described and in this way effecting a release of the lever 13 so that a load on the platform may act upon the load-counterbalancing and indicating mechanism.

During the elevation of the lever 48 by means of the coin the resilient member 45 is flexed to the position indicated in Figure III. Part of the force required to raise the lever 48 is expended in flexing the member 45 so that when the coin has reached the position shown in Figure III and the lever 28 has moved to releasing position, the potential force in the member 45 acts to complete the movement of the coin over the pin 43. The coin is then discharged through a substantially vertical tube 52 into a coin receptacle 53 located in the lower part of the column 3. It will be apparent that if the coin has been moved inward far enough to raise the lever 48 a sufficient distance to unlock the mechanism, very little force in the member 45 will move the coin over the pin 43 into the discharge chute. The member 45 therefore prevents any tendency of the coin to return to the position shown in Figure II in the event that the plunger has not been pressed in a sufficient distance to move the coin over the pin 43, yet far enough to raise the lever 48 sufficiently to unlock the mechanism. This feature of construction makes it impossible to obtain more than one weighing for each coin inserted.

The end of the lever 28 is suitably connected to a dash pot plunger 56 operating in a suitable fluid 57 contained in the dash pot receptacle 58, the dash pot serving to retard the action of the lever 28. In order to prevent the re-engagement of the teeth of the pawl 19 with those of the bar 17 before the weighing mechanism has had time to come to rest, the resilient member 25 is interposed between the screw 30 and projection 24 so that the movement of the plunger 33 will elevate the lever 28 to a comparatively large distance against the resiliency of the member 25 and a release of the lever 13 is, therefore, not effected until the lever 28 has been moved practically to its uppermost position. The resiliency in the member 25 is not sufficient to overcome the friction set up between the teeth of the pawl 19 and bar 17 by a load upon the scale platform and a release of the lever 13 will not, therefore, be effected until the member 25, screw 30 and projection 24 move as a unit. Upon release of the lever 13 by a disengagement of the teeth of the pawl 19 and bar 17, the member 25, having been previously flexed by upward movement of the lever 28, returns to its normal position, moving the pawl 19 a sufficient distance from the bar 17 so that the lever 28 may return almost to its normal position, retarded only by the dash pot 58, before the teeth of the pawl re-engage the teeth of the bar 17. This interval of time between the disengagement and re-engagement of the teeth of the pawl 19 with the teeth of the bar 17 is sufficient to permit the load-counterbalancing and indicating mechanism to move to a position offsetting the load upon the scale platform. When the load is removed from the scale the load-counterbalancing and indicating mechanism in returning to zero position moves the lever 13 upward, the teeth of the bar 17 overriding the teeth of the pawl, thus offering no appreciable resistance to the movement of the lever to the zero position. To obtain another weighing a coin must first be inserted to release the mechanism in the manner hereinbefore described.

In the modified form of my invention illustrated in Figures VIII to XI, one of the brackets 40' is provided with a pair of openings adapted to receive the ends of a pair of threaded pins or studs 64' which are adjustably secured to the projecting ears 65' of a movable member 66', the pins forming pivots about which the movable member may swing in a manner and for a purpose to be hereinafter described. An upwardly extending part of the member 66' is provided with a threaded opening adapted to receive the threaded end of a pin 68' which may be securely locked in an adjusted position by means of a nut 69'. The other end of the pin 68' normally projects into openings in the walls of the brackets 40' forming the coin chute. The member 66' is also provided with a laterally projecting ear 70' having an opening which receives one end of a U-shaped link 71', the other end of the link being received into suitable openings in the lever 13' and retained therein by means of a split pin 72'. It will be apparent from examination of Figures VIII and IX that with the lever 13' in the normal or zero position of the weighing mechanism, as illustrated in Figure VIII, the pin 68' projects into the openings in the brackets 40', forming a stop to prevent the coin from passing downward into the tube 52' before a weighing has been effected. When a person steps upon the scale platform and deposits a coin in the slot, subsequent inward pressure upon the plunger 33' moves the coin to the position illustrated in Figure XI, thus raising the lever 48' a sufficient distance to unlock the mechanism, the lever 13' being moved downwardly under the influence of the weight of the person. Movement of this lever causes a counterclockwise movement of the member 66' through the medium of the link 71' and operates to withdraw the pin 68' from the openings in the brackets 40', thus permitting the coin to fall into the coin tube 52'. With this construction a re-weighing employing the same coin cannot be had, as the support for the coin is temporarily removed with each successive weighing.

The plunger 33' is also provided with a pin 35', one end of which has an opening adapted to receive the end of a hairpin-shaped spring 37', the other end of which engages the wall of the frame 4', this spring acting to resiliently hold the plunger 33' in its normal or outermost position. The pin 35' also passes through and is adapted to operate in slots 74' located in the brackets 40' adjacent the plunger 33'. The slots serve two purposes—viz, to limit the endwise movement of the plunger and to serve as a guide therefor.

With the particular construction of that portion of the lever 48' which is engaged by the coin, as illustrated in Figure XI, it is possible for a person to insert a coin into the slot before stepping upon the platform, depress the plunger 33', and subsequently mount the platform and obtain a weighing, due to the fact that after the plunger has moved the coin to the position shown the coin is temporarily retained in this position with the locking mechanism released until the weighing mechanism is actuated by the weight of the person upon the platform. Thus it will be apparent that a person will not be deprived of a weighing if he has thoughtlessly placed the coin in the slot and depressed the plunger before he steps upon the scale platform. It is also obvious that after a weighing has been consummated and the person steps from the platform the weighing mechanism returns to zero position and movement of the lever 13' upwardly to its initial position will cause the pin or coin support 68' to be moved to its proper position in the coin chute.

In the modified form of the invention just described it is possible to utilize various sizes of coins in the device, as, for example, dimes, nickels and pennies, for the reason that a slight variation in the amount of movement of the lever 48', which is adapted to actuate the lever 28' to unlock the weighing mechanism, does not affect the operation of the device only in so far as the distance between the teeth of the ratchet and pawl mechanism when unlocked is slightly varied.

Referring to Figure XII, I have illustrated a modified form of dash pot which may be used in lieu of the dash pot 58 shown in Figure I, the plunger of which is connected to the lever 28, and which comprises a cylinder 58'' having a plunger 57'' adapted to operate therein, the plunger being provided with a plurality of openings 59''. A disk 60'' surrounds the plunger rod 61'' and is normally retained in a position adjacent the lower face of the plunger 57'' by means of a retractile spring 62'' interposed between the disk 60'' and a flange 63'' forming an integral part of the lower end of the rod 61''. With a construction of this kind it will be obvious to one skilled in the art that an inward movement of the plunger will elevate the lever connected to the plunger rod, thus moving the plunger 57'' upwardly, such movement being retarded by the fluid (not shown) in the dash pot. It is the purpose of the construction just described to decrease the retarding effect of the fluid upon the movement of the plunger in one direction. Obviously, when the plunger is moved upwardly the weight of the oil above the plunger 57'' and the difference between the atmospheric pressures above and below the plunger causes the disk 60'' to be slightly withdrawn from engagement with the plunger, thus permitting the passage of the fluid through the openings 59'', greatly decreasing the amount of force required to depress the coin operating plunger. The retarding action of the fluid in the dash pot is not affected when the plunger tends to return to its normal or lowermost position, because the disk is resiliently held against the plunger by means of the spring 62''.

The embodiments of my invention herein shown and described are to be regarded as illustrative only, and it is to be understood that the invention is susceptible to variation, modification and change within the spirit and scope of the subjoined claims.

Having described my invention, I claim:

1. In a weighing scale, in combination, weighing mechanism, a movable element connected to said weighing mechanism and having a series of teeth, a locking means for said weighing mechanism including a member having teeth engageable with the teeth of said movable element, a lever loosely connected to said toothed member, a coin controlled operating means for said lever including a manually operable member adapted to engage a coin and a transmission member adapted to be engaged by such coin and engaging said lever, said toothed member being capable of disengagement from said movable element after predetermined movement of said lever to effect a release of the weighing mechanism.

2. In a weighing scale, in combination, weighing mechanism, an element connected to said weighing mechanism and having a series of teeth, locking means including a pawl having teeth normally engageable with the teeth of said element, a lever, a resilient connection between said lever and said pawl, and coin-controlled means for actuating said lever to disengage said pawl and said element, said resilient means adapted to prevent immediate re-engagement of said pawl and said element.

3. In a weighing scale, in combination, weighing mechanism including a movable member, locking mechanism including a pawl, said pawl and said movable member having interlocking parts, a lever, a lost motion connection between said lever and said pawl, coin controlled means for operating said lever to effect a disengagement of said interlocking parts, and means for retarding the movement of said lever, said lost motion connection being so constructed as to prevent re-engagement of said interlocking parts until said retarding means has acted.

4. In a weighing scale, in combination, weighing mechanism, an element connected to said mechanism and having a series of teeth, locking mechanism including a toothed pawl, the teeth of which are engageable with the teeth of said element, a lever resiliently connected to said pawl, manually operable means adapted to act through a coin to actuate said lever to disengage said pawl and said toothed element, and means for retarding the movement of said lever, said resilient means preventing re-engagement of the toothed element and pawl for a short space of time.

5. In a weighing scale, in combination, weighing mechanism, locking means therefor, and means for releasing said locking means, comprising, in combination, a slotted plunger adapted to be forced inwardly, resilient means for yieldingly resisting inward movement of said plunger, a coin chute, the slot in said plunger being in registration with said coin chute, said plunger adapted to engage a coin upon inward movement thereof, and means extending into the slot of said plunger and adapted to be engaged by said coin to effect a release of said locking means to permit the weighing mechanism to assume a balanced position.

6. In a weighing scale, in combination, weighing mechanism including a movable member having a serrated portion, locking means for said weighing mechanism including a toothed pawl, the teeth of which normally engage the teeth of the movable member, and means for releasing said locking means comprising a plunger having a slot therein adapted to receive a coin.

7. In a weighing scale, in combination, weighing mechanism, locking means for said weighing mechanism, manually operable releasing means for said locking means, said releasing means adapted to engage and act upon a coin or like object, an element adapted to be acted upon by such coin for unlocking said weighing mechanism, and means actuated by movement of said weighing mechanism for completely discharging said coin.

8. In a weighing scale, in combination, weighing mechanism, locking means for said weighing mechanism, releasing means for said locking means, said releasing means having a member adapted to act upon a coin or like object, and means actuated by movement of said weighing mechanism to discharge said coin after a release of said weighing mechanism has been effected.

9. In a weighing scale, in combination, weighing mechanism, locking means for said weighing mechanism, manually operable releasing means for said locking means, including a slidable member, said slidable member adapted to engage and act upon a coin or like object, an element adapted to be acted upon by such coin for unlocking said weighing mechanism, and means operable upon movement of said weighing mechanism for discharging said coin.

10. In a weighing scale, in combination, weighing mechanism including a movable member, locking mechanism for said weighing mechanism, said locking mechanism and said movable member being provided with interlocking parts, releasing mechanism for said locking mechanism having a part adapted to be engaged by a coin or similar object, manually operable means adapted to engage said coin, and means connected to said movable member to discharge said coin upon predetermined movement of said lever to effect a release of the weighing mechanism.

11. In a weighing scale, in combination, weighing mechanism, locking means for said weighing mechanism, releasing means for said locking means including a member adapted to engage a coin or similar object to release said locking means, means connected to said locking means for normally retarding re-engagement of said locking means with said weighing mechanism, and means for decreasing the retarding effect of said retarding device when said releasing means is operated to disengage said locking means and said weighing mechanism.

12. In a weighing scale, in combination, weighing mechanism including a movable member, locking means for said weighing mechanism, said locking means and said movable member having interlocking parts, releasing means for said locking means including a member adapted to engage a coin which operates to disengage said interlocking parts, means connected to said locking means for normally retarding re-engagement of said parts, and means for decreasing the retarding effect of said retarding device when said releasing means is operated to disengage said interlocking parts.

13. In a weighing scale, in combination, weighing mechanism including a movable member, locking means for said weighing mechanism, said locking means and said movable member having interlocking parts, releasing means for said locking means, a lever connected to said locking means, manually operable means adapted to act through a coin to lift said lever to release said locking means, and means for retarding the downward movement of said lever, said retarding means being so constructed as to offer only slight resistance to the upward movements of said lever.

14. In a weighing scale, in combination, weighing mechanism, an element connected to said mechanism including a toothed pawl, the teeth of which are engageable with the teeth of said element, a lever resiliently connected to said pawl, manually operable means adapted to act through a coin to lift said lever to disengage said pawl and said toothed element, and means for retarding downward movement of said lever, said retarding means being so constructed as to offer only slight resistance to the upward movements of said lever and said resilient connection between the lever and said pawl being so constructed as to prevent re-engagement of the toothed element and pawl for a short space of time.

15. In a weighing scale, in combination, weighing mechanism including a movable member, locking means for said weighing mechanism, coin controlled releasing means for said weighing mechanism including a lever, said releasing means including a manually operable member adapted to move a coin into engagement with said lever, a support for said coin connected to said movable member, means on said lever including said support for retaining said coin in releasing position, and means whereby said support is withdrawn from engagement with said coin to discharge the latter when the movable member is actuated by movement of the weighing mechanism.

HALVOR O. HEM.